United States Patent
Kim et al.

(10) Patent No.: US 10,325,533 B2
(45) Date of Patent: Jun. 18, 2019

(54) ELECTRONIC DEVICE AND METHOD FOR OUTPUTTING ELECTRONIC DOCUMENT IN ELECTRONIC DEVICE

(71) Applicant: SAMSUNG ELECTRONICS CO., LTD., Suwon-si, Gyeonggi-do (KR)

(72) Inventors: Kyung Tae Kim, Suwon-si (KR); Kyoung Bong Kang, Suwon-si (KR); Eun Sol Park, Suwon-si (KR); Young Taeck Song, Suwon-si (KR); Soon Young Lee, Seoul (KR); Gyong Jin Joung, Seongnam-si (KR); Hee Jae Kim, Suwon-si (KR); Hyun Soo Shim, Seoul (KR); Dae Chan Jang, Seoul (KR); Jin Hyuk Jun, Hwaseong-si (KR); Jae Young Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 75 days.

(21) Appl. No.: 15/588,971

(22) Filed: May 8, 2017

(65) Prior Publication Data
US 2017/0322911 A1    Nov. 9, 2017

(30) Foreign Application Priority Data
May 9, 2016    (KR) .................. 10-2016-0056703

(51) Int. Cl.
*G06K 9/00*    (2006.01)
*G09G 3/00*    (2006.01)
(Continued)

(52) U.S. Cl.
CPC ............. *G09G 3/003* (2013.01); *G06F 3/011* (2013.01); *G06F 3/013* (2013.01); *G06F 3/0481* (2013.01);
(Continued)

(58) Field of Classification Search
CPC ........ G06F 3/011; G06F 3/013; G06F 3/0481; G06F 3/04815; G06F 3/0482;
(Continued)

(56) References Cited

U.S. PATENT DOCUMENTS 7,574,381 B1    8/2009    Lin-Hendel
7,680,694 B2    3/2010    Glazer et al.
(Continued)

*Primary Examiner* — Scott T Baderman
*Assistant Examiner* — Hassan Mrabi
(74) *Attorney, Agent, or Firm* — Nixon & Vanderhye P.C.

(57) ABSTRACT

An electronic device is provided. The electronic device includes a display configured to output a screen on which a web browser is executed, an input device comprising input circuitry configured to integrate with the display or be independent of the display, a communication circuit configured establish a communication channel with the network via a wired or wireless communication connection, a processor configured to be electrically connected with the communication circuit, the display, and the input device, and a memory configured to store a program and instructions for the web browser and be electrically connected with the processor. The memory stores the instructions which, when executed by the processor, cause the electronic device to perform at least one operation comprising: displaying the screen where the web browser is executed on the display, receiving a web document via the communication circuit, displaying the content on the first region based on the first code and displaying an object which may interact with the content on the second region based on the second code.

19 Claims, 16 Drawing Sheets

(51) Int. Cl.
*G06F 17/22* (2006.01)
*G06F 3/0481* (2013.01)
*G06F 17/27* (2006.01)
*G06F 3/01* (2006.01)
*G06F 3/0482* (2013.01)
*H04N 13/344* (2018.01)
*H04N 13/293* (2018.01)
*G06F 3/147* (2006.01)
*G09G 5/14* (2006.01)
*G06F 9/451* (2018.01)

(52) U.S. Cl.
CPC ........ *G06F 3/0482* (2013.01); *G06F 3/04815* (2013.01); *G06F 3/147* (2013.01); *G06F 17/2247* (2013.01); *G06F 17/272* (2013.01); *G09G 5/14* (2013.01); *H04N 13/293* (2018.05); *H04N 13/344* (2018.05); *G06F 9/451* (2018.02); *G06F 2203/04803* (2013.01); *G09G 2370/02* (2013.01); *G09G 2370/027* (2013.01); *G09G 2380/08* (2013.01)

(58) Field of Classification Search
CPC ........... G06F 3/147; G06F 2203/04803; G06F 9/451; G09G 3/003; G09G 5/14; G09G 2370/02; G09G 2370/027; G09G 2380/08; H04N 13/344; H04N 13/293
USPC ........................................................ 715/234
See application file for complete search history.

(56) References Cited

U.S. PATENT DOCUMENTS

| 8,145,295 | B2* | 3/2012 | Boyden ................ A61B 5/0071 600/476 |
| 9,358,103 | B1* | 6/2016 | Wortz .................... A61F 2/1694 |
| 2007/0179867 | A1 | 8/2007 | Glazer et al. |
| 2008/0300055 | A1* | 12/2008 | Lutnick ............... G07F 17/3209 463/39 |
| 2011/0176720 | A1* | 7/2011 | Van Osten ............. G06T 13/80 382/154 |
| 2014/0052550 | A1 | 2/2014 | Glazer et al. |
| 2015/0213649 | A1* | 7/2015 | Morishita ............. G06T 19/006 345/419 |
| 2016/0088287 | A1* | 3/2016 | Sadi ...................... H04N 13/254 348/43 |
| 2016/0132963 | A1 | 5/2016 | Lin-Hendel |
| 2017/0087453 | A1* | 3/2017 | Poisner ................. A63F 13/211 |
| 2017/0168566 | A1* | 6/2017 | Osterhout .............. G06F 1/163 |

* cited by examiner

ELECTRONIC DEVICE AND METHOD FOR OUTPUTTING ELECTRONIC DOCUMENT IN ELECTRONIC DEVICE

CROSS-REFERENCE TO RELATED APPLICATION

This application is based on and claims priority under 35 U.S.C. § 119 to a Korean patent application filed on May 9, 2016 in the Korean Intellectual Property Office and assigned Serial number 10-2016-0056703, the disclosure of which is incorporated by reference herein in its entirety.

TECHNICAL FIELD

The present disclosure relates generally to technologies for outputting electronic documents in virtual reality (VR) environments.

BACKGROUND

With the development of electronic technologies, various types of electronic products have been developed and distributed. Recently, there has been a growing interest in electronic devices which support virtual reality (VR) environments. For example, a head-mounted device (HMD) which may be worn on a head of a user has been actively developed. The HMD may detect motion or movement of the user and may provide part of an omnidirectional image (or multi-view image) corresponding to the motion or movement to the user.

If displaying a webpage using a web browser, an electronic device which supports the VR environments may display the webpage on a planar region and may display a user interface of a web browser on a peripheral region except for the region which displays the webpage. If an image provided by the electronic device which supports the VR environments is an omnidirectional image, an area of the peripheral region is larger than that of the region which displays the webpage. Thus, there is a need for a method for using the peripheral region in various manners to effectively use a space in the omnidirectional image.

SUMMARY

Example aspects of the present disclosure address at least the above-mentioned problems and/or disadvantages and provide at least the advantages described below. Accordingly, an example aspect of the present disclosure is to provide an electronic device for displaying a variety of objects on a region outside a region which displays a webpage and a method therefor.

In accordance with an example aspect of the present disclosure, an electronic device is provided. The electronic device may include a display configured to output a screen on which a web browser is executed, an input device comprising input circuitry, a communication circuit configured to establish a communication channel with the network by wired connection or wirelessly, a processor configured to be electrically connected with the communication circuit, the display, and the input device, and a memory configured to store a program for the web browser and be electrically connected with the processor. The memory may store instructions which, when executed by the processor, causing the electronic device to display the screen on which the web browser is executed on the display, to receive a web document, including a first code associated with a first region which is a planar display region displaying content and a second code associated with a second region which is a stereoscopic display region displaying a user interface of the web browser, via the communication circuit, to display the content on the first region based on the first code and to display an object associated with the content on the second region based on the second code.

In accordance with another example aspect of the present disclosure, an electronic device is provided. The electronic device may include a display configured to output a screen on which a web browser is executed, the screen being provided as a multi-view image and including a first region which is a planar display region displaying content and a second region which is a stereoscopic display region displaying a user interface of the web browser, a communication circuit configured to receive a web document including a first code associated with the first region and a second code associated with the second region from a server, and a processor configured to display the content on the first region based on the first code and to display an object on the second region based on the second code.

In accordance with another example aspect of the present disclosure, a method is provided. The method may include executing a web browser, outputting a screen on which a web browser is executed, the screen being provided as a multi-view image and including a first region which is a planar display region displaying content and a second region which is a stereoscopic display region displaying a user interface of the web browser, receiving a web document including a first code associated with the first region and a second code associated with the second region from a server, and displaying the content on the first region based on the first code and displaying an object on the second region based on the second code.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
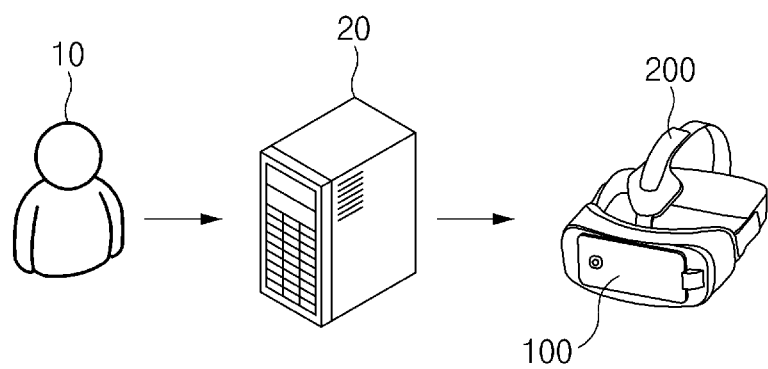
FIG. 1 is a diagram illustrating an example environment in which an electronic device is operated, according to an example embodiment of the present disclosure.

Hereinafter, various example embodiments of this disclosure may be described with reference to accompanying drawings. Terms used in this disclosure and embodiments are not intended to limit the scope of the present disclosure. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals. The terms of a singular form may include plural forms unless otherwise specified. In this disclosure, the expressions "A or B", "at least one of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the another element or may be connected through an intervening element (e.g., a third element).

According to the situation, the expression "configured to" used in this disclosure may be interchangeably used as, for example, the expression "suitable for", "having the capacity to", "adapted to", "made to", or "designed to" in hardware and/or software. In another situation, the expression "a device configured to" may refer to a situation in which the device is "capable of" operating together with another device or other components. For example, a "processor configured to (or set to) perform A, B, and C" may refer, for example, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but is not limited thereto. The wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit), or the like, but is not limited thereto. According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, and Google TV™), game consoles (e.g., Xbox™ and PlayStation™), electronic dictionaries, electronic keys, camcorders, electronic picture frames, or the like, but is not limited thereto.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like), or the like, but is not limited thereto. According to an embodiment, the electronic device may include at least one of parts of furniture, buildings/structures, or automobiles, electronic boards, electronic signature receiving devices, projectors, or various measuring instruments (e.g., water meters, electricity meters, gas meters, or wave meters, and the like), or the like, but is not limited thereto. According to various embodiments, the electronic device may be a flexible electronic device or may be a combination or two or more of the above-described devices. An electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a diagram illustrating an example environment in which an electronic device is operated, according to an example embodiment of the present disclosure.

Referring to FIG. 1, a content producer 10 may produce a web document. An electronic document (e.g., a web document) produced by the content producer 10 may be uploaded to a server 20. The web document may be distributed by a contents provider (CP). According to an embodiment, the server 20 may store the web document. According to an embodiment, the electronic device 100 may be mounted on a head-mounted device (HMD) 200. For example, if a uniform resource identifier (URI) corresponding to a web document is input through a web browser, the electronic device 100 may receive the web document from the server 20. The electronic device 100 may output the received web document on its display. For example, an image output on the display may be provided to a user through a lens and the like included in the HMD 200. A description will be given in detail of a detailed configuration of the electronic device 100 with reference to FIG. 2. A detailed description will be given of an example screen provided through the HMD 200 with reference to FIGS. 4 to 11.

Figure 2:
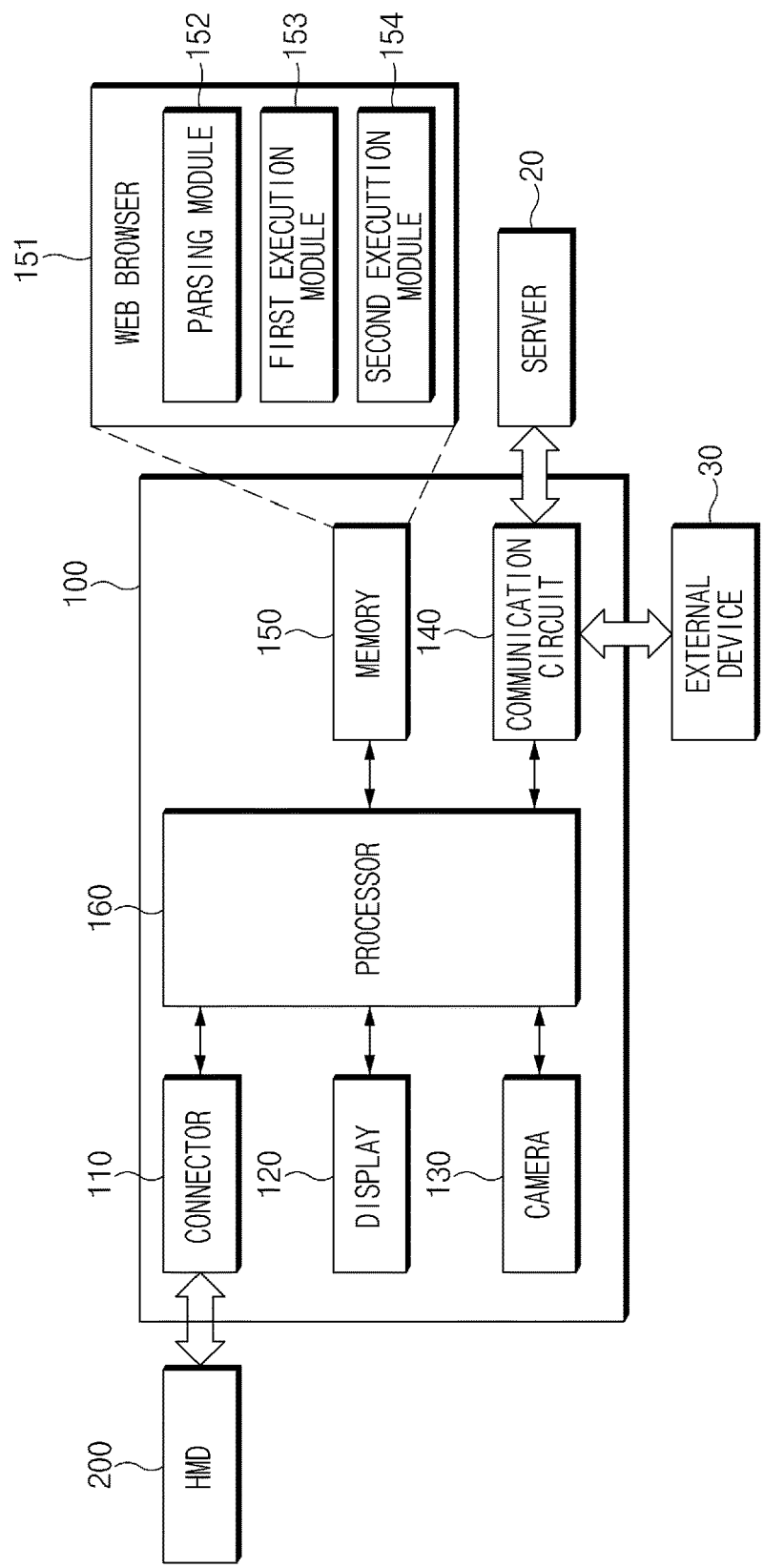
FIG. 2 is a block diagram illustrating an example configuration of an electronic device according to an example embodiment of the present disclosure.

FIG. 2 is a block diagram illustrating an example configuration of an example electronic device according to an example embodiment of the present disclosure.

Referring to FIG. 2, an electronic device 100 according to an embodiment of the present disclosure may include a connector 110, a display 120, a camera 130, a communication circuit 140, a memory 150, and a processor (e.g., including processing circuitry) 160. For example, and without limitation, the electronic device 100 may be a mobile device such as a smartphone which may be mounted on an HMD 200. In FIG. 2, an embodiment is exemplified as the electronic device 100 is mounted on the HMD 200. However, embodiments are not limited thereto. For example, the electronic device 100 may be a head-mounted electronic device. Alternatively, the electronic device 100 may be mounted on various types of wearable devices which may support a virtual reality (VR) environment other than the HMD 200. The electronic device 100 may be one of various types of electronic devices which may support a VR environment other than a head-mounted electronic device.

The connector 110 may be configured to be electrically connected with the HMD 200. For example, if the electronic device 100 is a mobile device such as a smartphone, the connector 110 may be electrically connected with the HMD 200 on which the electronic device 100 is mounted. The connector 110 may be an input/output interface, for example, a universal serial bus (USB) port.

According to an embodiment, the display 120 may output a screen, where a web browser 151 is executed, provided as a multi-view image. The multi-view image may be an image in which a view point may be changed in various manners. For example, in the multi-view image, a view point may be changed based on motion or movement of a user, detected by the electronic device 100 or the HMD 200. The multi-view image may be one of various types of images, for example, an omnidirectional image, a 360-degree image, a skydom image, a skybox image including 6 images, or a stereo skybox image including 12 images, or the like, but is not limited thereto. The image displayed on the display 120 may be provided to the user through a lens and the like of the HMD 200 connected with the electronic device 100. The display 120 may display an image on a location corresponding to a left lens of the HMD 200 and a location corresponding to a right lens of the HMD 200. For example, the display 120 may display a left-eye image in a stereo image on the location corresponding to the left lens and may display a right-eye image in the stereo image on the location corresponding to the right lens. For another example, the display 120 may display a normal image on the location corresponding to the left lens and the location corresponding to the right lens. For another example, the display 120 may process a three-dimensional (3D) object as a stereo image, may display a left-eye image in the processed stereo image on the location corresponding to the left lens, and may display a right-eye image in the processed stereo image on the location corresponding to the right lens. According to an embodiment, the screen where the web browser 151 is executed may include a first region (or a document region) which is a planar display region which displays content and a second region (or a chrome region) which is a stereoscopic display region which displays a user interface of the web browser 151. For example, the first region may display content included in a normal web document. The first region may be a planar display region such as a quadrangle. The first region may be located on a central portion of the screen where the web browser 151 is executed. For example, the second region may display a user interface of the web browser 151. The second region may be a stereoscopic display region such as a globular shape or a cylindrical shape. The second region may be configured for the user to recognize depth. The second region may be the other region except for the first region of the screen where the web browser 151 is executed. According to an embodiment, the screen where the web browser 151 is executed, displayed as the multi-view image, may have a wider area of the second region which is wider than that of a screen where a web browser is executed, displayed on a normal personal computer (PC) or a mobile device. For example, the area of the second region may be wider than that of the first region.

The camera 130 may capture a still image and/or a moving image. The camera 130 may capture a subject which is in an angle of view of the camera 130.

The communication circuit 140 may include various circuitry and communicate with the server 20 over a variety of communication networks. For example, and without limitation, the communication circuit 140 may be a cellular module (e.g., a cellular module 1321 of FIG. 13) or a wireless-fidelity (Wi-Fi) module (e.g., a Wi-Fi module 1323 of FIG. 13). The communication circuit 140 may receive a web document from the server 20. According to an embodiment, the received web document may include a first code associated with the first region and a second code associated with the second region. For example, the first code may include a code which describes content to be displayed on the first region. The second code may include a code which describes an object to be displayed on the second region. The first code may be a code included in normal web documents. The second code may be a code inserted into a web document to display an object on the second region according to an embodiment. The second code may be a code inserted into another file (e.g., a caption file) associated with a web document. The first code and the second code may be codes written by, for example, a hypertext markup language (HTML).

The memory 150 may include a volatile memory and/or a non-volatile memory. The memory 150 may store various modules comprising various program elements, such as, for example, and without limitation, the web browser 151. The web browser 151 may include a parsing module 152 for parsing a web document, a first execution module 153 for executing the first code, and a second execution module 154 for executing the second code. The web browser 151 stored in the memory 150 may be executed by the processor 160.

The processor 160 may include various processing circuitry and be electrically connected with the connector 110, the display 120, the camera 130, the communication circuit 140, and the memory 150.

According to an embodiment, the processor 160 may display content on the first region based on the first code and may display an object, which may interact with the content, on the second region based on the second code. The content displayed on the first region may be main content included in a web document. The content displayed on the first region may be a webpage displayed on a normal web browser. The content displayed on the first region may include text, an image, a video, and the like. The content may be two-dimensional (2D) content or three-dimensional (3D) content. The object displayed on the second region may include, for example, a 360-degree image, a skydom image, a skybox image, a 3D skybox image, a video clip, or the like. For another example, the object may be a 3D object. The 3D object may be implemented in various formats, for example, fbx, obj, a declarative 3D format (e.g., x3d and the like), or an imperative 3D format (e.g., webGL, webVR, or the like).

According to an embodiment, the processor 160 may extract the first code and the second code by parsing a web document using the parsing module 152 of the web browser 151. The processor 160 may display content on the first region by executing the first code using the first execution module 153. The processor 160 may display an object on the second region by executing the second code using the second execution module 154. A description will be given in detail of an example screen, which displays an image on the first region and the second region, with reference to FIGS. 4 to 11.

According to an embodiment, the processor 160 may control an external device 30 which is linked with the electronic device 100, based on the second code. The external device 30 may include various devices, such as a joystick or an electrically-powered chair, which may interwork with the electronic device 100. If an effect on vibration is defined in the second code, the processor 160 may transmit a control signal to the external device 30 such that the external device 30 vibrates. The processor 160 may control the external device 30 using the communication circuit 140 (e.g., the Wi-Fi module 1323 or a Bluetooth (BT) module 1325 of FIG. 13).

Figure 3:
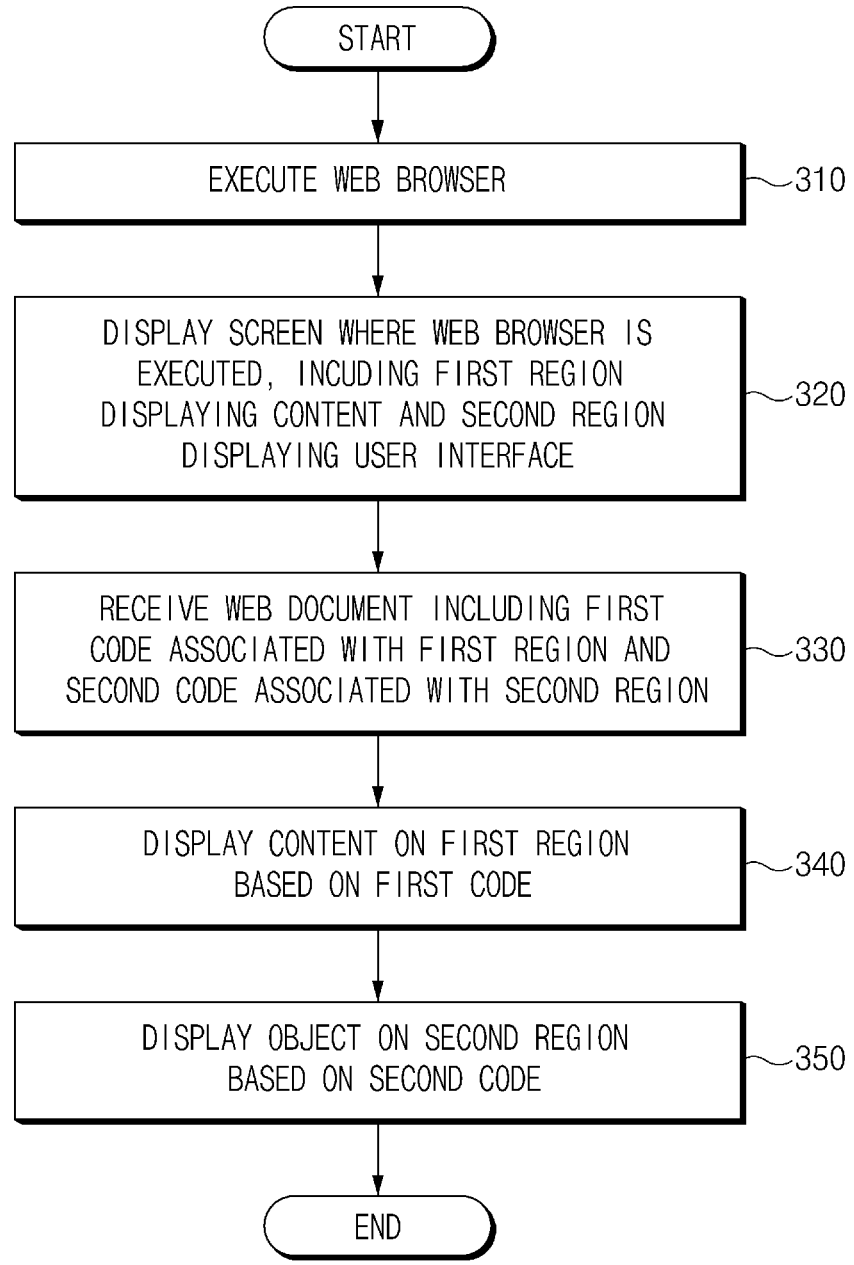
FIG. 3 is a flowchart illustrating an example method for outputting an electronic document in an electronic device according example to an embodiment of the present disclosure.

FIG. 3 is a flowchart illustrating an example method for outputting an electronic document in an electronic device according to an example embodiment of the present disclosure.

Operations illustrated in FIG. 3 may include operations processed by an electronic device 100 illustrated in FIG. 2. Thus, although there are details omitted below, details described about the electronic device 100 with reference to FIG. 2 may be applied to the operations illustrated in FIG. 3.

Referring to FIG. 3, in operation 310, the electronic device 100 may execute a web browser. The electronic device 100 may execute the web browser which may provide a multi-view image via, for example, the electronic device 100 or an HMD electrically connected with the electronic device 100.

In operation 320, the electronic device 100 may output a screen, where the web browser is executed, as a multi-view image. The electronic device 100 may display the screen where the web browser is executed, including a first region which is a planar display region which displays content and a second region which is a stereoscopic display region which displays a user interface of the web browser.

In operation 330, the electronic device 100 may receive a web document including a first code associated with the first region and a second code associated with the second region from a server. The electronic device 100 may extract the first code and the second code by parsing the received web document.

In operation 340, the electronic device 100 may display content on the first region based on the first code.

In operation 350, the electronic device 100 may display an object on the second region based on the second code. For example, the electronic device 100 may display an object, associated with the content displayed on the first region, on the second region. The object may interact with the content. A description will be given in detail of an example screen, a first region and a second region of which display an image, with reference to FIGS. 4 to 11.

Figure 4:
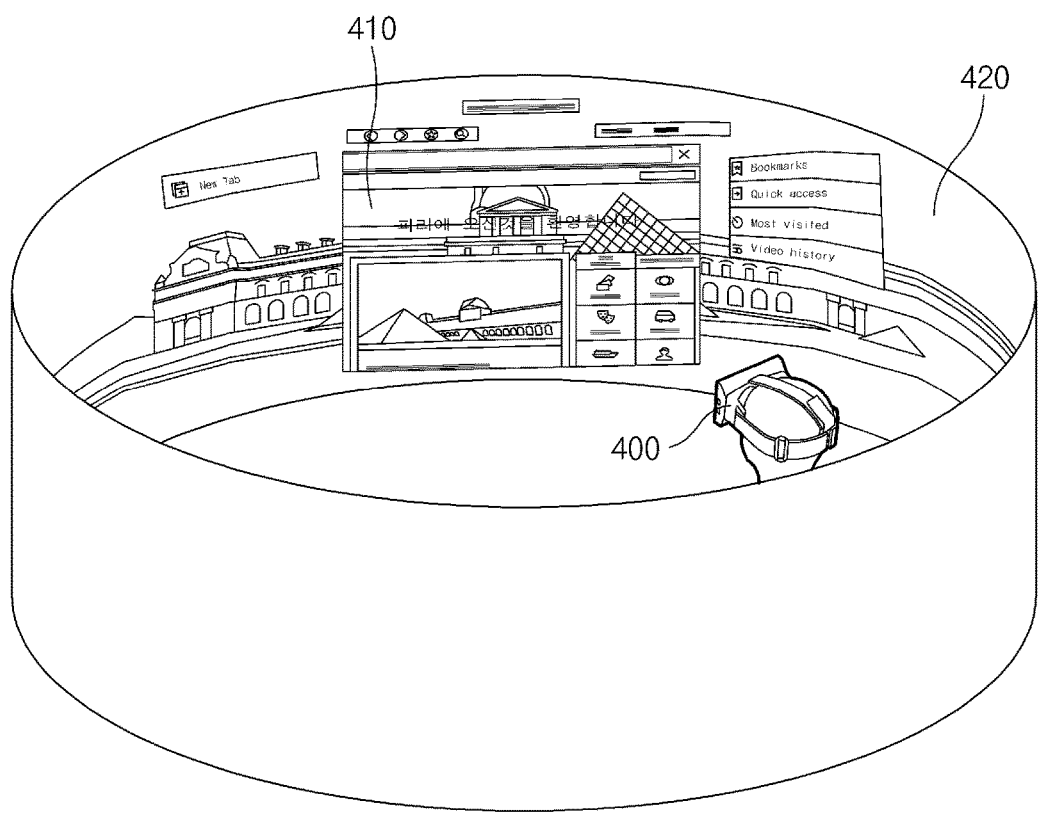
FIG. 4 is a diagram illustrating an example screen output by an electronic device according to an example embodiment of the present disclosure.

FIG. 4 is a diagram illustrating an example screen output by an electronic device according to an example embodiment of the present disclosure.

Referring to FIG. 4, the electronic device may display a screen where a web browser is executed. In FIG. 4, an embodiment is exemplified as the screen where the web browser is executed is a cylindrical 360-degree image. However, embodiments are not limited thereto. For example, the screen where the web browser is executed may be a variety of multi-view images such as a globular omnidirectional image. The screen where the web browser is executed may include a first region 410 which displays content and a second region 420 which displays a user interface. If a URI is input through the web browser, the electronic device may receive a web document corresponding to the URI from a server. The electronic device may display an image on the first region 410 and the second region 420 by executing a first code and a second code included in the web document. For example, a homepage of a web site corresponding to the URI input through the web browser may be displayed on the first region. Alternatively, a user interface and a background image of the web browser may be displayed on the second region 420.

According to an embodiment, the electronic device may display an image, associated with the second code included in the web document, as a background of the second region 420 on the second region 420. The electronic device may parse the second code included in the web document. The electronic device may display an image described in the second code on the second region 420. The image may be a multi-view image such as an omnidirectional image. An example second code to display the multi-view image as a background of the second region 420 may be described below.

[Code of Web Document]
<link id="watch" async rel="vr-background" href="bg.jpg">

Herein, href="bg.jpg" may refer to an image inserted into the second region 420, and rel="vr-background" may mean that "bg.jpg" is inserted as a background of the second region 420.

According to an embodiment, if an event occurs in the webpage displayed on the first region 410, the electronic device may change a background of the second region 420. For example, if a user input is provided to a specified point of the first region 410, the electronic device may change a background image of the second region 420. For example, the specified point and the background image may be included in the second code.

Figure 5:
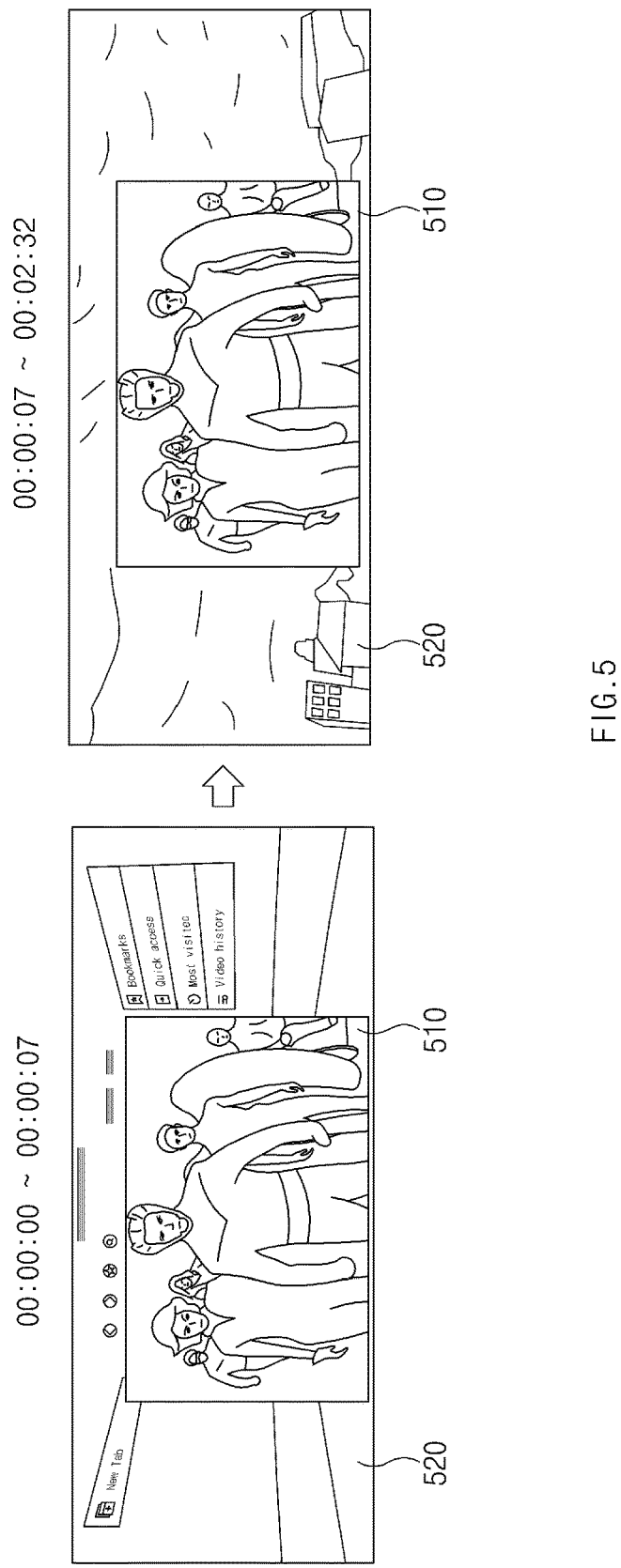
FIG. 5 is a diagram illustrating an example screen output by an electronic device according to an example embodiment of the present disclosure.

FIG. 5 is a diagram illustrating an example screen output by an electronic device according to an example embodiment of the present disclosure.

Referring to FIG. 5, the electronic device may display a screen where a web browser is executed, including a first region 510 and a second region 520. The screen where the web browser is executed may be a multi-view image. The second region 520 may be the other region except for the first region 510 of the screen where the web browser is executed and may be a region outside the first region 510.

According to an embodiment, the electronic device may display a moving image associated with a first code on the first region 510. The electronic device may extract a second code by parsing a caption file associated with the moving image displayed on the first region 510. The caption file may be implemented with, for example, a vtt standard format. Information about the caption file may be described as the first code in a web document. The electronic device may display an object associated with the second code on the second region 520. For example, the electronic device may display an image described in the second code on the second region 520. Alternatively, the electronic device may display the image described in the second code in a time set in the second code. For example, the electronic device may display the image described in the second code on the second region 520 during a period from 7 seconds to 2 minutes 32 seconds. Example first and second codes to display the image on the second region 520 in the set time may be described below.

```
[Code of Web Document (index.html)]
<!doctype html>
...
<video controls autoplay src="xmen.webm">
<track default src="xmen.vtt">
</video>
[Code of Caption File(xmen.vtt)]
00:00:07.000 --> 00:02:32.000
<background src="cloud.jpg">
```

Herein, <track default src="xmen.vtt"> may refer to a caption file associated with a moving image reproduced on the first region 510, <background src="cloud.jpg"> may refer to an image inserted into the second region 520, and "00:00:07.000 -->00:02:32.000" may refer to a time when "cloud.jpg" is displayed on the second region 520.

According to an embodiment, the electronic device may display an object at a size set in the second code. For example, the electronic device may display an image on the second region 520 such that a width of the image is 120% of a width of the first region 510. An example second code to display the image on the second region 520 at the set size may be described below.

```
[Code of Caption File (xmen.vtt)]
00:00:07.000 --> 00:02:32.000
<video src="xmen_bg1.webm" style="width:120%">
```

Herein, "00:00:07.000 -->00:02:32.000" may mean a time when an image is displayed on the second region 520, and style="width:120%" may mean a ratio between a width of an image displayed on the second region 520 and a width of the first region 510.

According to an embodiment, the electronic device may change an image based on control (e.g., play, stop, pause, fast forward, rewind, or the like) of a moving image. For example, if playing a moving image, the electronic device may display a first image on the second region 520. If fast forwarding a moving image, the electronic device may display a second image on the second region 520. Information associated with images according to control of the moving image may be included in the second code.

FIGS. 6A, 6B, 6C, 6D and 6E are diagrams illustrating example screens output by an electronic device according to an example embodiment of the present disclosure.

Referring to FIGS. 6A to 6E, the electronic device may display a screen where a web browser is executed, including a first region 610 and a second region 620. The screen where the web browser is executed may be a multi-view image. The second region 620 may be the other region except for the first region 610 of the screen where the web browser is executed and may be a region outside the first region 610.

Figure 6A:
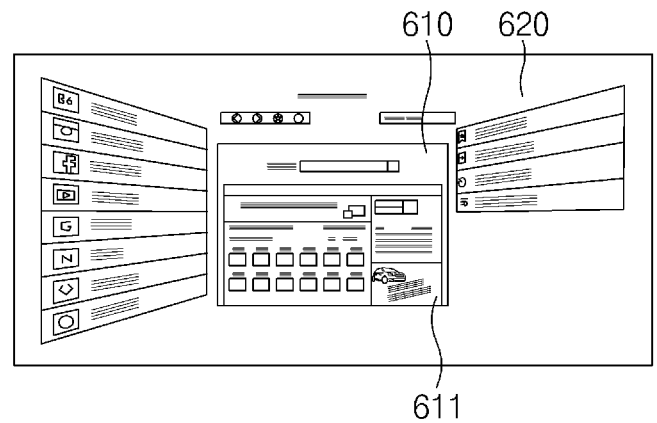
FIGS. 6A, 6B, 6C, 6D, and 6E are diagrams illustrating example screens output by an electronic device according to an example embodiment of the present disclosure.

Referring to FIG. 6A, the electronic device may display a webpage on the first region 610 and may display a user interface of the web browser on the second region 620. The electronic device may display an advertising image 611 described in a first code on the first region 610.

Figure 6B:
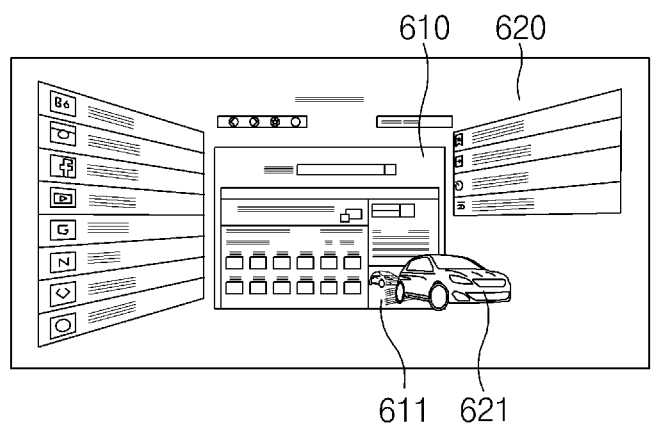

Referring to FIG. 6B, the electronic device may display an object 621 associated with content displayed on the first region 610. For example, if an input on the advertising image 611 is provided, the electronic device may display the object 621 (e.g., a 3D object of a vehicle shape) associated with the advertising image 611. The electronic device may display the object 621 described in a second code on the second region 620. Part of the object 621 may be displayed on the first region 610. The electronic device may display the object 621 such that the object 621 is moved based on a script included in the second code. For example, the object 621 may be displayed to move in a right direction of the screen where the web browser is executed. The electronic device may zoom in or out on the object 621.

Figure 6C:
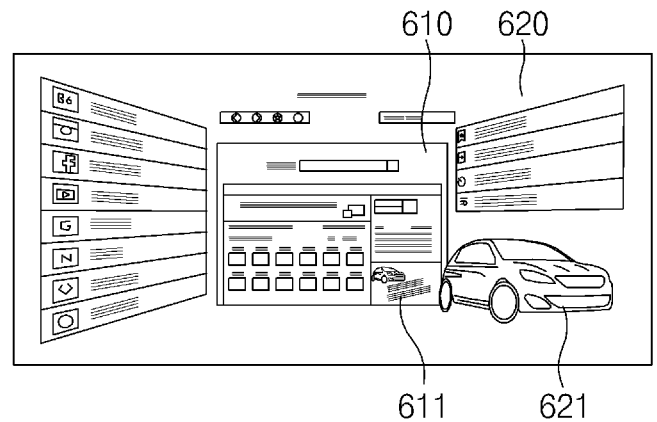

Referring to FIG. 6C, the electronic device may move and stop the object 621 based on the script. The electronic device may receive a user input on a region which displays the object 621.

Figure 6D:
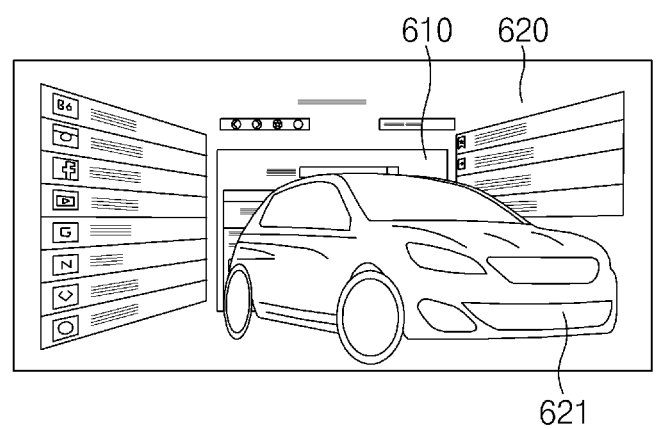

Referring to FIG. 6D, if the user input on the object 621 is provided, the electronic device may zoom in on the object 621 and may display the zoomed-in object 621.

Figure 6E:
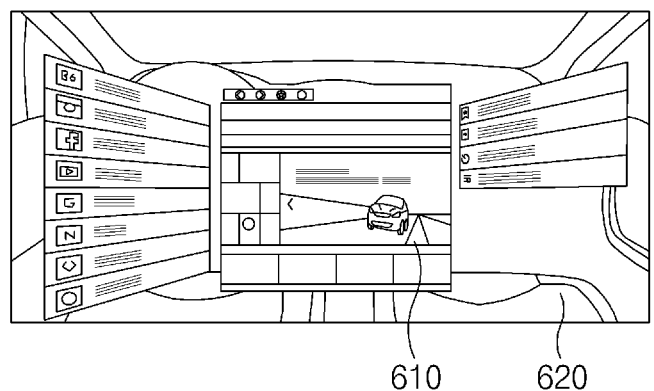

Referring to FIG. 6E, if the user input on the object 621 is provided, the electronic device may zoom in on the object 621 and may change the screen. The electronic device may display another content associated with the object 621 on the first region 610 and may display another object associated with the object 621 on the second region 620. For example, the electronic device may display a webpage, which displays information of the object 621, on the first region 610 and may display an image in the vehicle on the second image 620. The other content and/or the other object associated with the object 621 may be described in, for example, the second code included in a web document. For another example, another web document associated with the other content associated with the object 621 may be described in the second code, and the other object may be described in a second code of another web document. An example second code to perform the above-mentioned operation may be described below.

```
[Code of Web Document]
<link id="car" async rel="vr-object" href="car.obj">
<script>window. watch.onload = function( )
{    /* control the obj */ };</script>
```

Herein, href="car.obj" may refer to the object 621 inserted into the second region 620 and rel="vr-object" may mean that "car.obj" is inserted as an object into the second region 620. script>window. watch.onload =function( )may be a script for moving the object 621.

According to an embodiment, the electronic device may display the object 621 in a time set in the second code. An example second code to display the object 621 on the second region 620 in the set time may be described below.

```
[Code of Caption File]
00:00:07.000 --> 00:02:32.000
    <object id="car" src="car.obj">
```

Herein, src="car.obj" may refer to the object 621 inserted into the second region 620, object id="car" may refer to an ID of the object 621, and "00:00:07.000-->00:02:32.000" may refer to a time when "car.obj" is inserted into the second region 620.

According to an embodiment, the electronic device may display part of a webpage, displayed together with the object 621 on the first region 610, on the second region 620. For example, the electronic device may display part of a webpage, including information associated with the vehicle around the object 621 around the object 621, on the second region 620.

Figure 7:
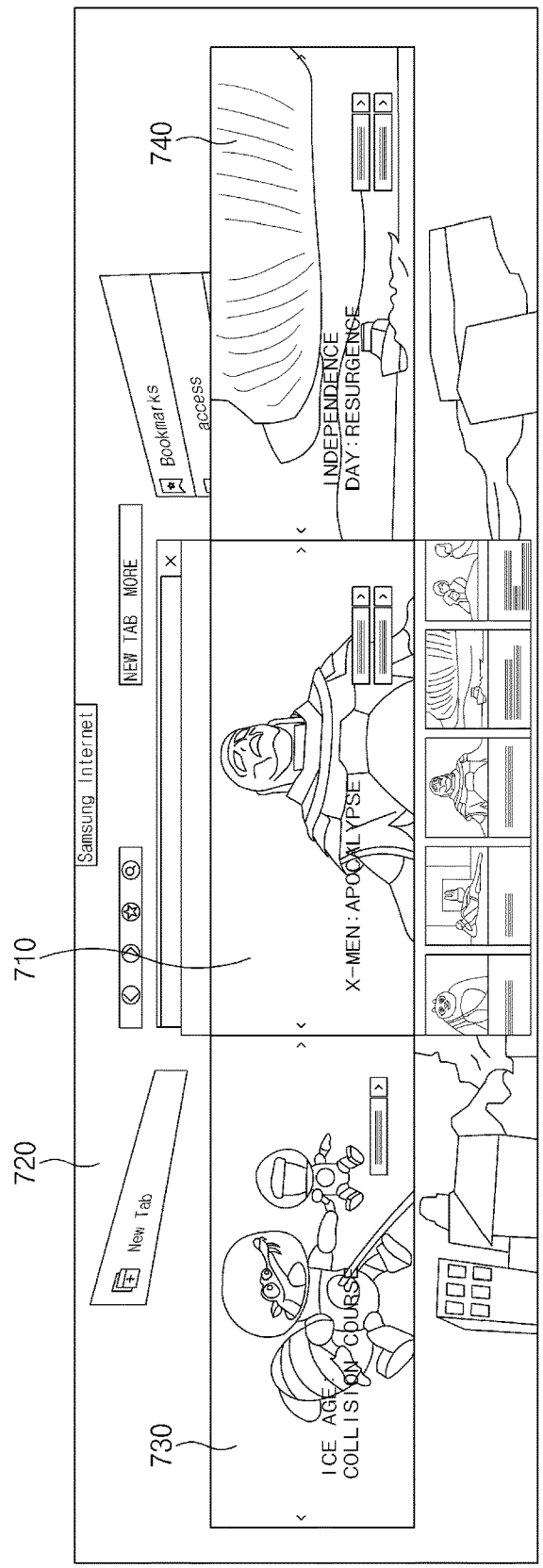
FIG. 7 is a diagram illustrating an example screen output by an electronic device according to an example embodiment of the present disclosure.

FIG. 7 is a diagram illustrating an example screen output by an electronic device according to an example embodiment of the present disclosure.

Referring to FIG. 7, the electronic device may display a screen where a web browser is executed, including a first region 710, a second region 720, a third region 730, and a fourth region 740. Each of the third region 730 and the fourth region 740 may be a region of the same type as that of the first region 710. For example, each of the third region 730 and the fourth region 740 may be a planar display region which displays content. The third region 730 may be located to be adjacent to the left of the first region 710, and the fourth region 740 may be located to be adjacent to the right of the first region 710.

According to an embodiment, the electronic device may display content on the first region 710, the third region 730, and the fourth region 740. If a user input is provided on the first region 710, the third region 730, and the fourth region 740, the content displayed on the first region 710, the third region 730, and the fourth region 740 may be changed. For example, if a flicking input oriented from the left to the right is provided, content displayed on the third region 730 before the flicking input may be displayed on the first region 710, content displayed on the first region 710 before the flicking input may be displayed on the fourth region 740, and another content may be displayed on the third region 730. For another example, if a flicking input oriented from the right to the left is provided, content displayed on the fourth region 740 before the flicking input may be displayed on the first region 710, content displayed on the first region 710 before the flicking input may be displayed on the third region 730, and another content may be displayed on the fourth region 740. Further, an image displayed on the second region 720 may be changed to an image associated with the content displayed on the first region 710 after the flicking input.

Figure 8:
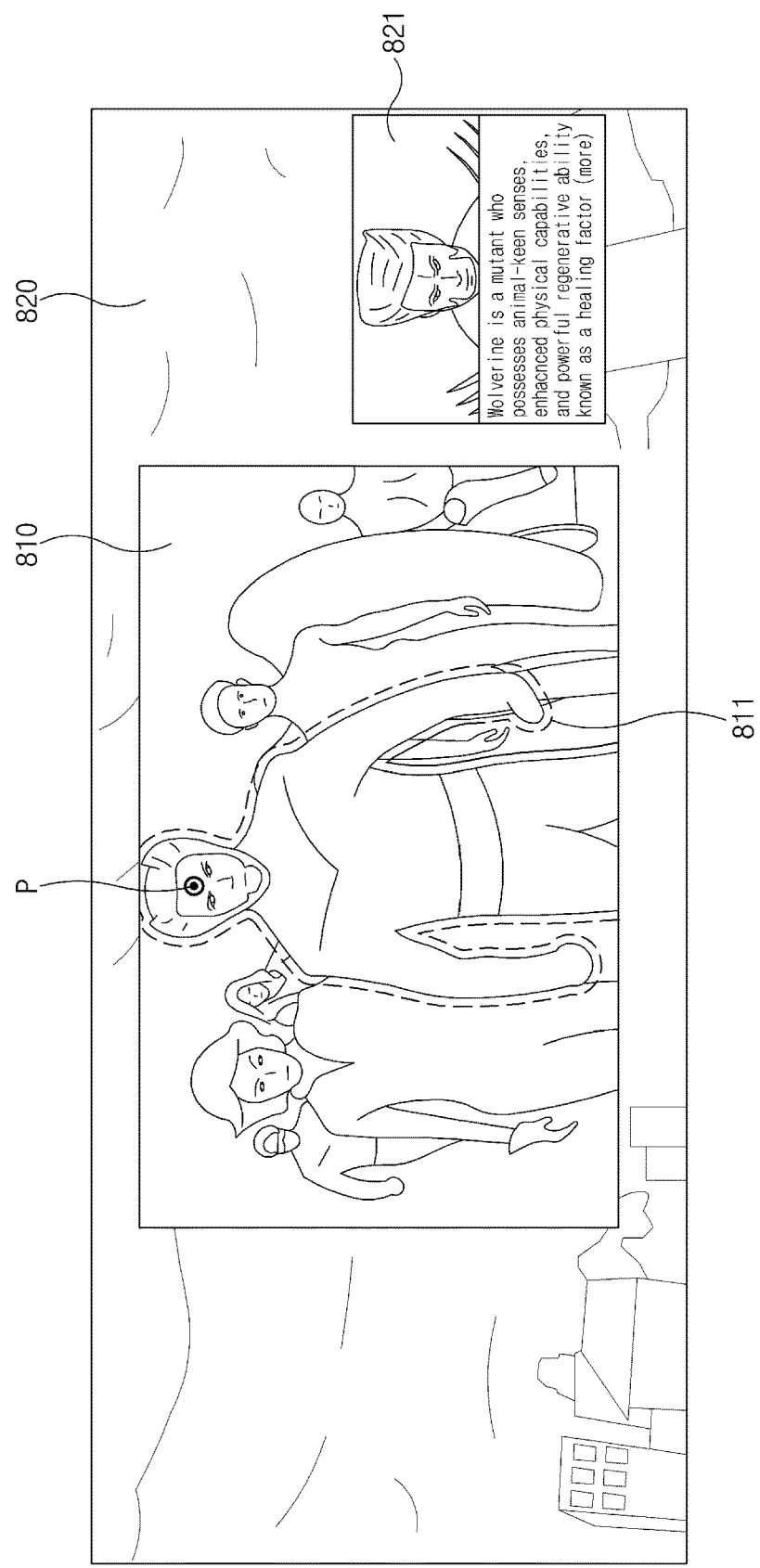
FIG. 8 is a diagram illustrating an example screen output by an electronic device according to an example embodiment of the present disclosure.

FIG. 8 is a diagram illustrating an example screen output by an electronic device according to an example embodiment of the present disclosure.

Referring to FIG. 8, the electronic device may display a screen where a web browser is executed, including a first region 810 and a second region 820. The second region 820 may be the other region except for the first region 810 of the screen where the web browser is executed and may be a region outside the first region 810.

According to an embodiment, if an input P is provided on a region 811 set in a second code, the electronic device may display an object 821 associated with the second code on the second region 820. For example, if an input is provided on the set region 811, the electronic device may display the object 821 associated with the set region 811 on the second region 820. For example, the electronic device may display a moving image on the first region 810. If a user of the electronic device gazes at the set region 811 of the first region 810, the electronic device may display an object 821 associated with the set region 811. The second code may include a code for the object 821 which displays information associated with the set region 811. For example, if an input is provided on a point P in the region 811 which displays a specific character in a moving image of the first region 810, the electronic device may display the object including information about the specific character on the second region 820. For example, after the electronic device renders the object 821 in advance, if recognizing an input on the region 811 which displays the specific character, the electronic device may displays the object 821 together with a moving image. Example first and second codes to display the above-mentioned object 821 on the second region 820 may be described below.

```
[Code of Web Document (index.html)]
<div id="wolverine_info">
    <img src="~~"><p>Wolverine is a mutant>
    [Code of Caption file (xmen.vtt)]
    00:00:07.000 --> 00:00:09.000
        <a id="wolverine" coords="23 53 536 343 634
343 43 53" href="# wolverine_info">
```

Herein, href="# wolverine_info" may refer to the object 821 displayed on the second region 820, coords="23 53 536 343 634 343 43 53" may refer to the set region 811, id="wolverine" may refer to an ID of the object 821, and "00:00:07.000-->00:00:09.000" may refer to a time when the object 821 is displayed in response to an input on the set region 811.

Figure 9:
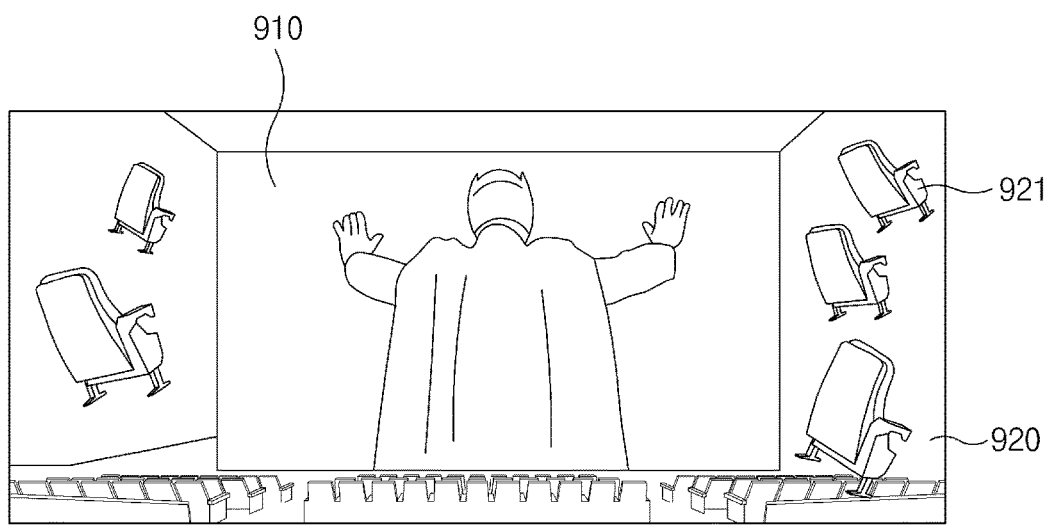
FIG. 9 is a diagram illustrating an example screen output by an electronic device according to an example embodiment of the present disclosure.

FIG. 9 is a diagram illustrating an example screen output by an electronic device according to an example embodiment of the present disclosure.

Referring to FIG. 9, the electronic device may display a screen where a web browser is executed, including a first region 910 and a second region 920. The second region 920 may be the other region except for the first region 910 of the screen where the web browser is executed and may be a region outside the first region 910.

According to an embodiment, the electronic device may display a moving image on the first region 910 and may display a background image on the second region 920. For example, the electronic device may reproduce a movie on the first region 910 and may display an indoor image of a theater on the second region 920. The electronic device may change another object 921, displayed together with an object associated with a second code on the second region 920, based on the second code. For example, the electronic device may change the object 921 displayed on the second region 920 in location, angle, size, and the like displayed based on the second code in response to a physical effect which occurs in content displayed on the first region 910. For example, the electronic device may display the object 921 of a theater's chair shape on the second region 920. The object 921 of the theater's chair shape may be an object stored in the electronic device and may be an object which is not described in a web document received to reproduce a moving image. If a physical effect of moving peripheral metal occurs in content displayed on the first region 910, the electronic device may provide an effect as if the object 921 of the theater's chair shape displayed on the second region 920 floats. An example second code to change the above-mentioned object 921 displayed on the second region 920 may be described below.

```
[Code of Caption File (xmen.vtt)]
00:00:07.000 --> 00:00:09.000
<effect type=levitative strength=30%>
```

Herein, "effect type=levitative" may refer to an effect which is applied to the object, "strength=30%" may refer to a level at which an effect is applied and "00:00:07.000-->00:00:09.000" may refer to a time interval in which the effect is applied.

According to an embodiment, the electronic device may transmit a physical effect which occurs in content displayed on the first region 910 to an external electronic device connected to the electronic device. For example, if the electronic device is connected with a sofa which provides a vibration effect and if an earthquake occurs in content displayed on the first region 910 of the electronic device, the electronic device may transmit a signal to the sofa such that vibration occurs in the sofa.

According to an embodiment, if a movie reservation page is displayed on the first region 910 of the electronic device, the electronic device may display a theater image on the second region 920. The electronic device may change a theater image displayed on the first region 910 or the second region 920 based on a location of a seat selected among seats displayed on the first region 910.

Figure 10:
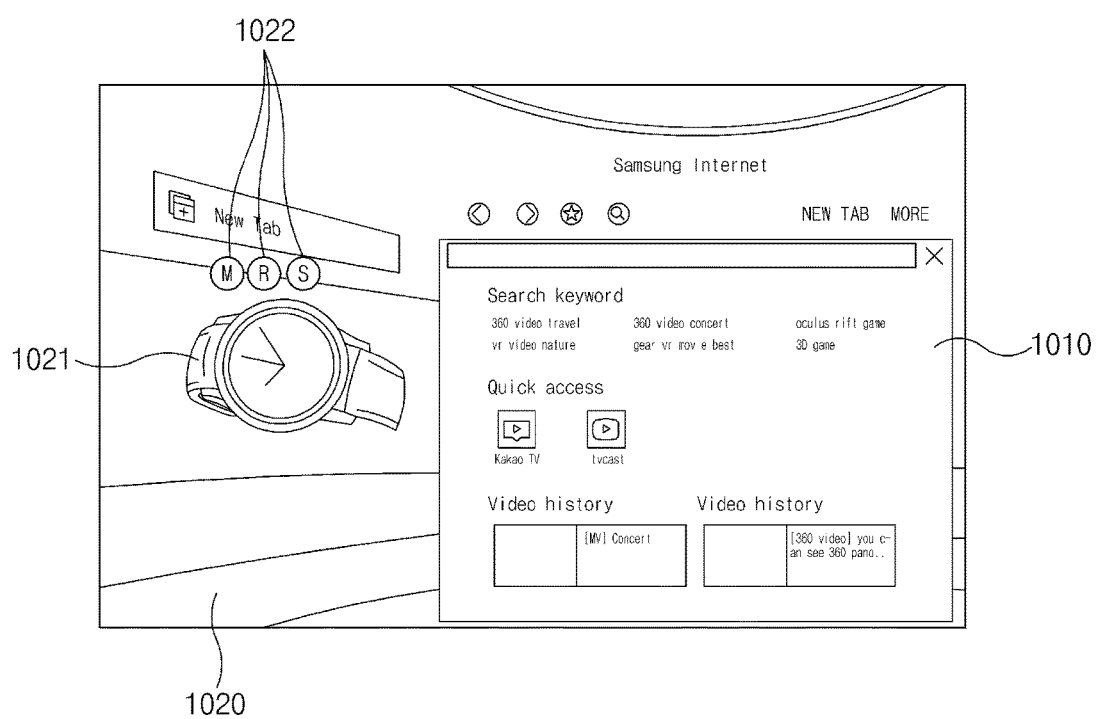
FIG. 10 is a diagram illustrating an example screen output by an electronic device according to an example embodiment of the present disclosure.

FIG. 10 is a diagram illustrating an example screen output by an electronic device according to an example embodiment of the present disclosure.

Referring to FIG. 10, the electronic device may display a screen where a web browser is executed, including a first region 1010 and a second region 1020. The second region 1020 may be the other region except for the first region 1010 of the screen where the web browser is executed and may be a region outside the first region 1010.

According to an embodiment, if an input on an object 1021 displayed on the second region 1020 is provided, the electronic device may change a location, angle, size, or the like where the object 1021 is displayed. For example, if an input such as a click or drag on a region which displays the object 1021 of a watch shape is provided, the electronic device may change a size at which the object 1021 is displayed. For another example, if an input is provided to on a button (e.g., "M," "R," "S") 1022 displayed on the object 1021, the electronic device may change a location, angle, size, or the like where the object 1021 is displayed.

Figure 11:
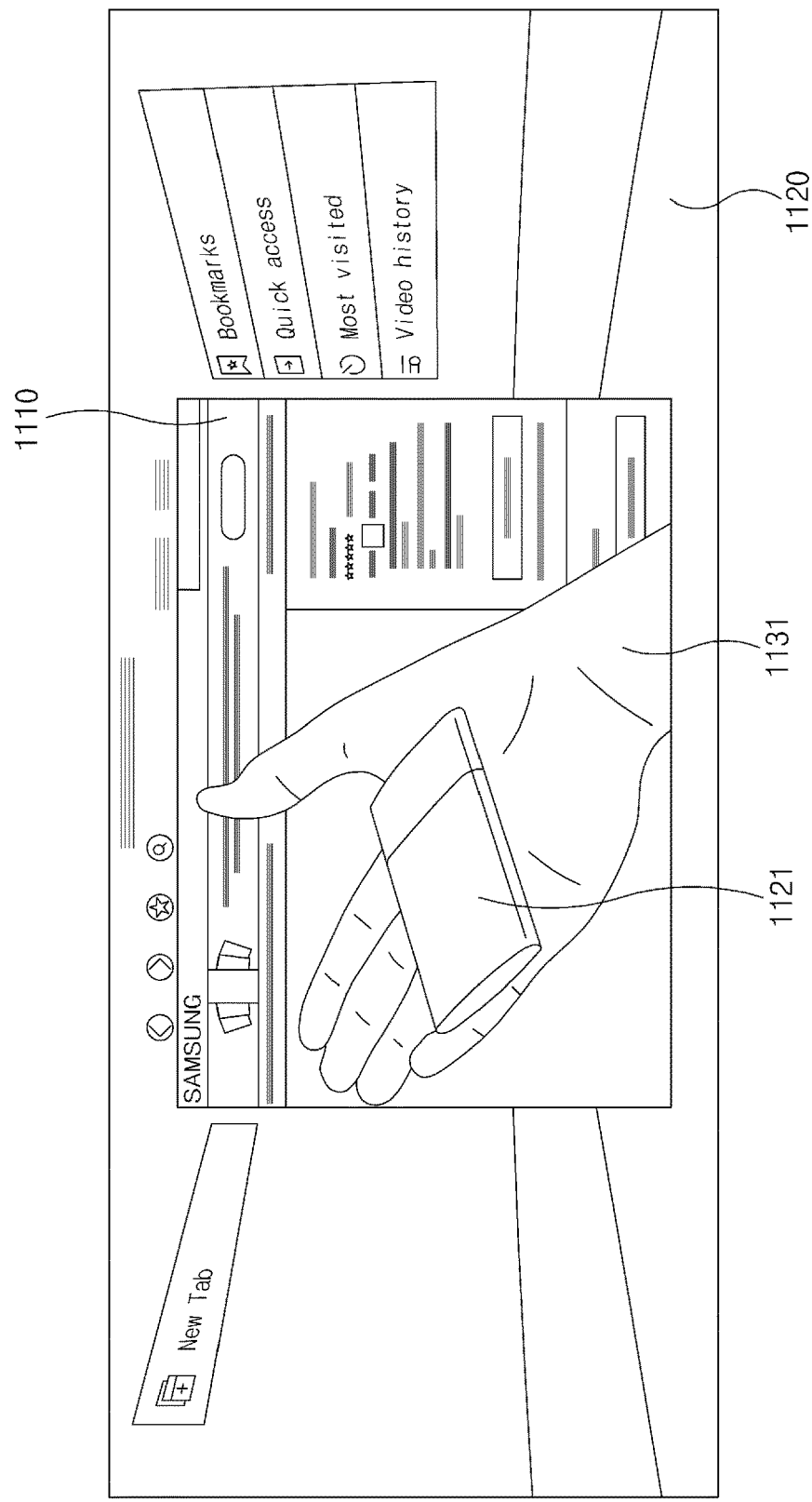
FIG. 11 is a diagram illustrating an example screen output by an electronic device according to an example embodiment of the present disclosure.

FIG. 11 is a diagram illustrating an example screen output by an electronic device according to an example embodiment of the present disclosure.

Referring to FIG. 11, the electronic device may display a screen where a web browser is executed, including a first region 1110 and a second region 1120. The second region 1120 may be the other region except for the first region 1110 of the screen where the web browser is executed and may be a region outside the first region 1110.

According to an embodiment, the electronic device may display an object 1121 on the first region 1110 or the second region 1120. The electronic device may display the object 1121 in proportion to a real size of a subject 1131 captured by its camera and a real size of the object 1121. For example, the electronic device may display the 3D object 1121 of a battery shape on the first region 1110. The electronic device may capture the hand 1131 of a user using the camera. The electronic device may display the captured hand 1131 together with the 3D object 1121 of the battery shape. The electronic device may display the 3D object 1121 and the captured hand 1131 on the first region 1110 or the second region 1120 in proportion to a real size of a battery indicated by the 3D object 1121 and a real size of the captured hand 1131. A size of the hand 1131 of the user may be a value stored in the electronic device or may be a value calculated based on a captured image. A size of the battery indicated by the 3D battery 1121 may be a value stored in a web document. The electronic device may display the hand 1131 of the user and the 3D object 1121 of the battery shape by reflecting the real size of the hand 1131 of the user and the real size of the battery to visually compare the size of the hand 1131 of the user with the size of the battery.

An electronic device for supporting a virtual reality (VR) environment according to an embodiment of the present disclosure may include a display configured to output a screen where a web browser is executed, an input device configured to integrate with the display or be independent of the display, a communication circuit configured to wirelessly or using a wire establish a communication channel with the network, a processor configured to be electrically connected with the communication circuit, the display, and the input device, and a memory configured to store a program and instructions for the web browser and be electrically connected with the processor. The memory may store the instructions, when executed, causing the processor to display the web browser on the display, receive a web document, including a first code associated with a first region which is a planar display region which displays content and a second code associated with a second region which is a stereoscopic display region which displays a user interface of the web browser, via the communication circuit, and display the content on the first region based on the first code and display an object which may interact with the content on the second region based on the second code.

According to another feature of the present disclosure, the instructions may cause the processor to display an image described in the second code as a background of the second region on the second region based on the content displayed on the first region.

An electronic device according to an embodiment of the present disclosure may include a display configured to output a screen where a web browser is executed, the screen being provided as a multi-view image and including a first region which is a planar display region which displays content and a second region which is a stereoscopic display region which displays a user interface of the web browser, a communication circuit configured to receive a web document including a first code associated with the first region and a second code associated with the second region from a server, and a processor configured to display the content on the first region based on the first code and display an object on the second region based on the second code.

According to another feature of the present disclosure, the first region may be a quadrangular display region. The second region may be a globular or cylindrical display region.

According to another feature of the present disclosure, the electronic device may further include a memory configured to store the web browser including a parsing module configured to parse the web document, a first execution module configured to execute the first code, and a second execution module configured to execute the second code. The processor may be configured to extract the first code and the second code by parsing the web document using the parsing module, display the content on the first region using the first execution module, and display the object on the second region using the second execution module.

According to another feature of the present disclosure, the processor may be configured to display an image associated with the second code on the second region.

According to another feature of the present disclosure, the processor may be configured to display a moving image associated with the first code on the first region, extract the second code by parsing a caption file associated with the first code, and display the object associated with the second code on the second region.

According to another feature of the present disclosure, the processor may be configured to display the object in a time set in the second code.

According to another feature of the present disclosure, the processor may be configured to display the object at a size set in the second code.

According to another feature of the present disclosure, the processor may be configured to change the object based on a script included in the second code.

According to another feature of the present disclosure, the processor may be configured to display another content associated with the object on the first region if an input on the object is provided and display another object associated with the object on the second region.

According to another feature of the present disclosure, the processor may be configured to display the object associated with the second code if a user of the electronic device gazes at a region set in the second code.

According to another feature of the present disclosure, the processor may be configured to change another object displayed together with the object associated with the second code on the second region, based on the second code.

According to another feature of the present disclosure, the processor may be configured to control an external device which is linked with the electronic device, based on the second code.

According to another feature of the present disclosure, the processor may be configured to change a location, angle, or size where the object is displayed, if an input on the object is provided.

According to another feature of the present disclosure, the electronic device may further include a camera configured to be electrically connected with the processor. The processor may be configured to display the object together with a subject captured by the camera in proportion to a real size of the object and a real size of the captured subject.

A method according to an embodiment may include executing a web browser, outputting a screen where a web browser is executed, the screen being provided as a multi-view image and including a first region which is a planar display region which displays content and a second region which is a stereoscopic display region which displays a user interface of the web browser, receiving a web document including a first code associated with the first region and a second code associated with the second region from a server, displaying the content on the first region based on the first code, and displaying an object on the second region based on the second code.

According to another feature of the present disclosure, the method may further include extracting the first code and the second code by parsing the web document.

According to another feature of the present disclosure, the method may further include extracting the second code by parsing a caption file associated with the first code.

A computer storage medium according to an embodiment of the present disclosure may store computer-readable instructions executed by at least one processor or a display driving circuit. The instructions may be configured to execute a web browser, output a screen where a web browser is executed, the screen being provided as a multi-view image and including a first region which is a planar display region which displays content and a second region which is a stereoscopic display region which displays a user interface of the web browser, receive a web document including a first code associated with the first region and a second code associated with the second region from a server, display the content on the first region based on the first code, and display an object on the second region based on the second code.

Figure 12:
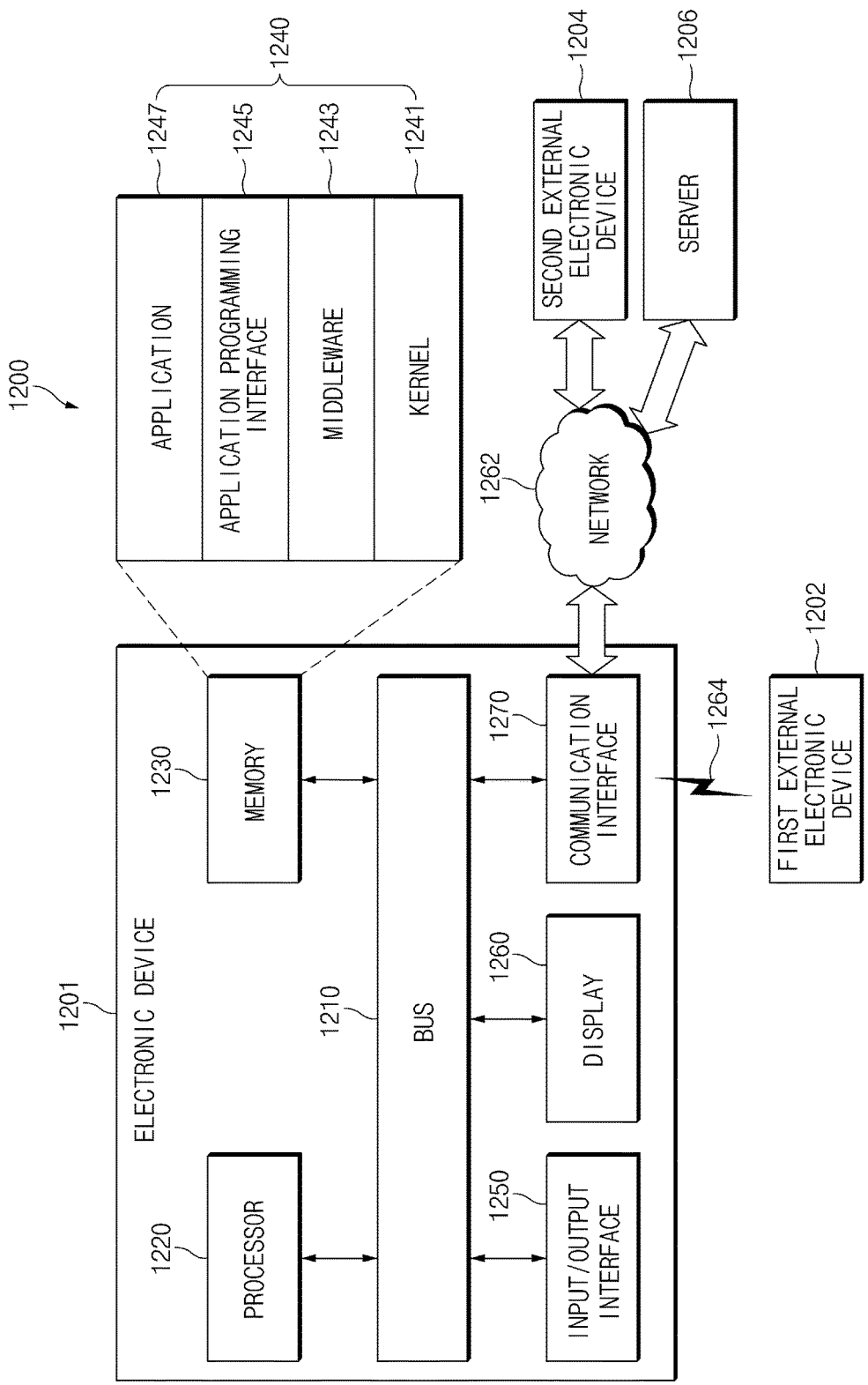
FIG. 12 is a block diagram illustrating an example configuration of an electronic device in a network environment according to various example embodiments of the present disclosure.

Referring to FIG. 12, according to various example embodiments, an electronic device 1201 in a network environment 1200 is described. The electronic device 1201 may include a bus 1210, a processor (e.g., including processing circuitry) 1220, a memory 1230, an input/output interface (e.g., including input/output circuitry) 1250, a display 1260, and a communication interface (e.g., including communication circuitry) 1270. According to an embodiment, the electronic device 1201 may not include at least one of the above-described elements or may further include other element(s).

The bus 1210 may interconnect the above-described elements 1210 to 1270 and may include a circuit for conveying communications (e.g., a control message and/or data) among the above-described elements.

The processor 1220 may include various processing circuitry, such as, for example, and without limitation, one or more of a dedicated processor, a central processing unit (CPU), an application processor (AP), or a communication processor (CP). For example, the processor 1220 may perform an arithmetic operation or data processing associated with control and/or communication of at least other elements of the electronic device 1201.

The memory 1230 may include a volatile and/or nonvolatile memory. For example, the memory 1230 may store instructions or data associated with at least one other element(s) of the electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)". For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform, for example, a mediation role such that the API 1245 or the application program 1247 communicates with the kernel 1241 to exchange data. Furthermore, the middleware 1243 may process task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247 and may process the one or more task requests. The API 1245 may be an interface through which the application program 1247 controls a function provided by the kernel 1241 or the middleware 1243, and may include, for example, at least one interface or function (e.g., an instruction) for a file control, a window control, image processing, a character control, or the like. The input/output interface 1250 may play a role, for example, of an interface which transmits an instruction or data input from a user or another external device, to other element(s) of the electronic device 1201 or may output an instruction or data, received from other element(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display, or the like, but is not limited thereto. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may include various communication circuitry and establish communication between the electronic device 1201 and an external device (e.g., the first external electronic device 1202, the second external electronic device 1204, or the server 1206). For example, the communication interface 1270 may be connected to the network 1262 over wireless communication or wired communication to communicate with the external device (e.g., the second external electronic device 1204 or the server 1206). Additionally, the communication interface 170 may be connected to a first external electronic device 1202 over a short-range wireless communication connection 1264.

The wireless communication may include cellular communication that uses at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. According to an embodiment, the wireless communication may include at least one of wireless fidelity (Wi-Fi), Bluetooth, Bluetooth low energy (BLE), Zigbee, near field communication (NFC), magnetic secure transmission (MST), radio frequency (RF), body area network (BAN), or the like. According to an embodiment, the wireless communication may include global navigation satellite system (GNSS). The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), power-line communication (PLC), a plain old telephone service (POTS), or the like. The network 1262 may include at least one of telecommunications networks, for example, a computer network (e.g., LAN or WAN), an Internet, or a telephone network.

Each of the first and second external electronic devices 1202 and 1204 may be a device of which the type is different from or the same as that of the electronic device 1201. According to various embodiments, all or a portion of operations that the electronic device 1201 will perform may be executed by another or plural electronic devices (e.g., the electronic device 1202, the electronic device 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 at other device (e.g., the electronic device 1202 or 1204 or the server 1206). The other electronic device (e.g., the electronic device 1202 or 1204 or the server 1206) may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
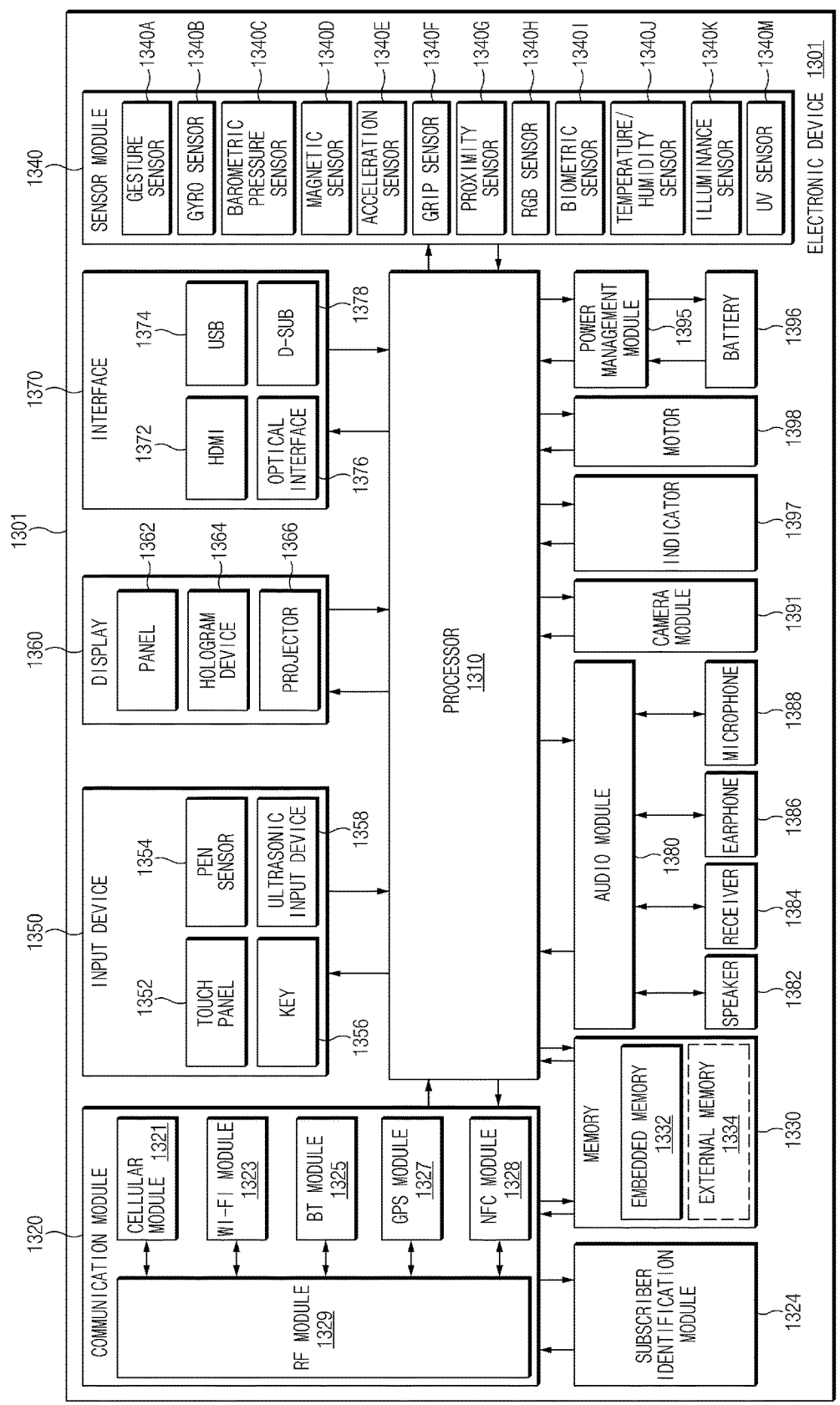
FIG. 13 is a block diagram illustrating an example configuration of an electronic device according to various example embodiments of the present disclosure.

FIG. 13 is a block diagram illustrating an example electronic device 1301, according to various example embodiments. An electronic device 1301 may include, for example, all or a part of the electronic device 1201 illustrated in FIG. 12. The electronic device 1301 may include one or more processors (e.g., an application processor (AP)) (e.g., including processing circuitry) 1310, a communication module (e.g., including communication circuitry) 1320, a subscriber identification module 1324, a memory 1330, a sensor module 1340, an input device (e.g., including input circuitry) 1350, a display 1360, an interface (e.g., including interface circuitry) 1370, an audio module 1380, a camera module 1391, a power management module 1395, a battery 1396, an indicator 1397, and a motor 1398.

The processor 1310 may include various processing circuitry and drive, for example, an operating system (OS) or an application to control a plurality of hardware or software elements connected to the processor 1310 and may process and compute a variety of data. For example, the processor 1310 may be implemented with a System on Chip (SoC). According to an embodiment, the processor 1310 may further include a graphic processing unit (GPU) and/or an image signal processor. The processor 1310 may include at least a part of elements illustrated in FIG. 13. The processor 1310 may load an instruction or data, which is received from at least one of other elements (e.g., a nonvolatile memory), into a volatile memory and process the loaded instruction or data. The processor 1310 may store a variety of data in the nonvolatile memory.

The communication module 1320 may be configured the same as or similar to the communication interface 1270 of FIG. 12. The communication module 1320 may include various communication circuitry, such as, for example, and without limitation, a cellular module 1321, a Wi-Fi module 1323, a Bluetooth (BT) module 1325, a GNSS module 1327, a near field communication (NFC) module 1328, and a radio frequency (RF) module 1329. The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1324. According to an embodiment, the cellular module 1321 may perform at least a portion of functions that the processor 1310 provides. According to an embodiment, the cellular module 1321 may include a communication processor (CP). According to an embodiment, at least a part (e.g., two or more) of the cellular module 1321, the Wi-Fi module 1323, the BT module 1325, the GNSS module 1327, or the NFC module 1328 may be included within one Integrated Circuit (IC) or an IC package. For example, the RF module 1329 may transmit and receive a communication signal (e.g., an RF signal). For example, the RF module 1329 may include a transceiver, a power amplifier module (PAM), a frequency filter, a low noise amplifier (LNA), an antenna, or the like. According to another embodiment, at least one of the cellular module 1321, the Wi-Fi module 1323, the BT module 1325, the GNSS module 1327, or the NFC module 1328 may transmit and receive an RF signal through a separate RF module. The subscriber identification module 1324 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1330 (e.g., the memory 1230) may include an internal memory 1332 and/or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, or the like), a hard drive, or a solid state drive (SSD). The external memory 1334 may include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 13401, a temperature/humidity sensor 1340J, an illuminance sensor 1340K, or an UV sensor 1340M. Although not illustrated, additionally or generally, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include various input circuitry, such as, for example, and without limitation, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user. The (digital) pen sensor 1354 may be, for example, a part of a touch panel or may include an additional sheet for recognition. The key 1356 may include, for example, a physical button, an optical key, a keypad, or the like. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 1260) may include a panel 1362, a hologram device 1364, a projector 1366, and/or a control circuit for controlling the panel 1362, the hologram device 1364, or the projector 1366. The panel 1362 may be implemented, for example, to be flexible, transparent or wearable. The panel 1362 and the touch panel 1352 may be integrated into a single module. According to an embodiment, the panel 1362 may include a pressure sensor (or a force sensor) that is capable of measuring an intensity of a pressure for a touch of a user. The pressure sensor may be integrated with the touch panel 1352 or may be implemented with one or more sensors independently of the touch panel 1352. The hologram device 1364 may display a stereoscopic image in a space using a light interference phenomenon. The projector 1366 may project light onto a screen so as to display an image. For example, the screen may be arranged in the inside or the outside of the electronic device 1301.

The interface 1370 may include various interface circuitry, such as, for example, and without limitation, a high-definition multimedia interface (HDMI) 1372, a universal serial bus (USB) 1374, an optical interface 1376, or a D-subminiature (D-sub) 1378. The interface 1370 may be included, for example, in the communication interface 1270 illustrated in FIG. 12. Additionally or generally, the interface 1370 may include, for example, a mobile high definition link (MHL) interface, a SD card/multi-media card (MMC) interface, or an infrared data association (IrDA) standard interface.

The audio module 1380 may convert a sound and an electric signal in dual directions. At least a part of the audio module 1380 may be included, for example, in the input/output interface 1250 illustrated in FIG. 12. The audio module 1380 may process, for example, sound information that is input or output through a speaker 1382, a receiver 1384, an earphone 1386, or the microphone 1388. For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp). The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. For example, the electronic device 1301 may include a processing device (e.g., a GPU) for supporting a mobile TV. The processing device may process media data according to the standards of digital multimedia broadcasting (DMB), digital video broadcasting (DVB), MediaFlo™, or the like. Each of the above-mentioned elements of the electronic device according to various embodiments of the present disclosure may be configured with one or more components, and the names of the elements may be changed according to the type of the electronic device. In various embodiments, the electronic device (e.g., the electronic device 1301) may omit some of the above-mentioned elements or further include other additional elements. Furthermore, some of the elements of the electronic device may be combined with each other so as to form one entity, so that the functions of the elements may be performed in the same manner as before the combination.

Figure 14:
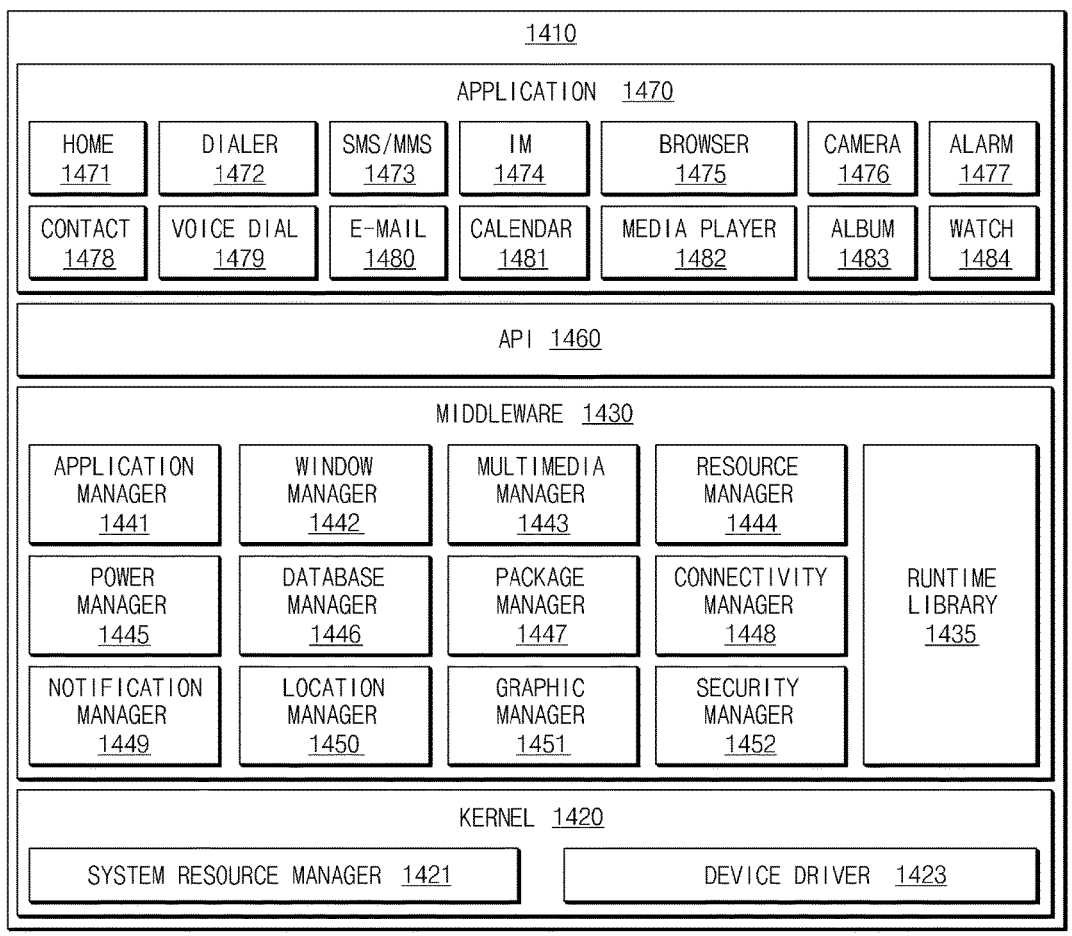
FIG. 14 is a block diagram illustrating an example configuration of a program module according to various example embodiments of the present disclosure.

FIG. 14 is a block diagram illustrating an example program module, according to various example embodiments. According to an embodiment, a program module 1410 (e.g., the program 1240) may include an operating system (OS) to control resources associated with an electronic device (e.g., the electronic device 1201), and/or diverse applications (e.g., the application program 1247) driven on the OS. The OS may be, for example, Android™, iOS™, Windows™, Symbian™, Tizen™, or Bada™.

Referring to FIG. 14, the program module 1410 may include a kernel 1420 (e.g., the kernel 1241), a middleware 1430 (e.g., the middleware 1243), an application programming interface (API) 1460 (e.g., the API 1245), and/or an application 1470 (e.g., the application program 1247). At least a portion of the program module 1410 may be preloaded on an electronic device or may be downloadable from an external electronic device (e.g., the electronic device 1202, the electronic device 1204, the server 1206, or the like).

The kernel may include, for example, a system resource manager 1421 or a device driver 1423. The system resource manager 1421 may perform control, allocation, or retrieval of system resources. According to an embodiment, the system resource manager 1421 may include a process managing unit, a memory managing unit, or a file system managing unit. The device driver 1423 may include, for example, a display driver, a Bluetooth driver, a shared memory driver, a USB driver, a keypad driver, a Wi-Fi driver, an audio driver, or an inter-process communication (IPC) driver.

The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may include, for example, a library module that is used by a compiler to add a new function through a programming language while the application 1470 is being executed. The runtime library 1435 may perform input/output management, memory management, or capacities about arithmetic functions. The application manager 1441 may manage, for example, a life cycle of the application 1470. The window manager 1442 may manage a graphic user interface (GUI) resource that is used in a screen. The multimedia manager 1443 may identify a format necessary for playing diverse media files, and may perform encoding or decoding of media files by using a codec suitable for the format. The resource manager 1444 may manage source code or a memory space of the application 1470. The power manager 1445 may manage battery capacity or power, and may provide power information for an operation of an electronic device. According to an embodiment, the power manager 1445 may operate with a basic input/output system (BIOS). The database manager 1446 may generate, search for, or modify database that is to be used in the application 1470. The package manager 1447 may install or update an application that is distributed in the form of package file.

The connectivity manager 1448 may manage, for example, wireless connection. The notification manager 1449 may provide, for example, an event such as arrival message, appointment, or proximity notification. The location manager 1450 may manage, for example, location information about an electronic device. The graphic manager 1451 may manage, for example, a graphic effect that is provided to a user, or manage a user interface relevant thereto. The security manager 1452 may provide system security or user authentication. According to an embodiment, the middleware 1430 may include a telephony manager for managing a voice or video call function of the electronic device or a middleware module that combines diverse functions of the above-described elements. The middleware 1430 may provide a module specialized to each OS kind. The middleware 1430 may dynamically remove a part of the preexisting elements or may add new elements thereto.

The API 1460 (e.g., the API 1245) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1470 (e.g., the application program 1247) may include, for example, one or more applications capable of providing functions for a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a watch 1484, and, although not shown, an application for offering health care (e.g., measuring an exercise quantity, blood sugar, or the like) or environment information (e.g., information of barometric pressure, humidity, temperature, or the like).

According to an embodiment, the application 1470 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may transmit notification information, which arise from other applications of an electronic device, to an external electronic device or may receive notification information from the external electronic device and provide the notification information to a user. For example, the device management application may install, delete, or update a function (e.g., turn-on/turn-off of an external electronic device itself (or a part of elements) or adjustment of brightness (or resolution) of a display) of the external electronic device which communicates with the electronic device, or an application running in the external electronic device. According to an embodiment, the application 1470 may include an application (e.g., a health care application of a mobile medical device) that is assigned in accordance with an attribute of an external electronic device. According to an embodiment, the application 1470 may include an application that is received from an external electronic device. At least a portion of the program module 1410 may be implemented by software, firmware, hardware (e.g., the processor 1310), or a combination of two or more thereof and may include modules, programs, routines, sets of instructions, processes, or the like for performing one or more functions.

The term "module" used in this disclosure may include a unit implemented with hardware, software and firmware and/or any combination thereof and may be interchangeably used with the terms such as "logic", "logical block", "component" and "circuit". The "module" may be an integrated component or may be a minimum unit that performs one or more functions or a part thereof. The "module" may be implemented mechanically or electronically. For example, the "module" may include, for example, and without limitation, a dedicated processor, a CPU, an application-specific IC (ASIC) chip, a field-programmable gate array (FPGA), or a programmable-logic device for performing some operations, which are known or will be developed.

At least a part of an apparatus (e.g., modules or functions thereof) or a method (e.g., operations) according to various embodiments may be implemented by instructions stored in a computer-readable storage media in the form of a program module. The instruction, when executed by a processor (e.g., the processor 1220), may cause the processor and/or the electronic device to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. The instruction may include code generated by a compiler or code executable on a computer using an interpreter. A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to an embodiment of the present disclosure, the electronic device and the method therefor may increase utilization of a second region by displaying a variety of objects on the second region which displays a user interface.

In addition, the electronic device and the method therefor may provide a variety of effects directly or indirectly ascertained through the present disclosure.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a display configured to output a screen on which a web browser is executed;
   an input device comprising input circuitry;
   a communication circuit configured to establish a communication channel with the network via a wired and/or wireless connection;
   a processor configured to be electrically connected with the communication circuit, the display, and the input device; and
   a memory configured to store a program for the web browser and be electrically connected with the processor,
   wherein the memory stores instructions which, when executed by the processor, cause the electronic device to perform at least one operation, the at least one operation comprising:
   displaying the screen where the web browser is executed on the display;
   receiving a web document, including a first code associated with a first region comprising a planar display region displaying content and a second code associated with a second region comprising a stereoscopic display region displaying a user interface of the web browser, via the communication circuit;
   displaying the content on the first region based on the first code;
   displaying an object associated with the content on the second region based on the second code; and
   displaying another content associated with the object on the first region and displaying another object associated with the object on the second region, if an input on the object is received.

2. The electronic device of claim 1, wherein the at least one operation further comprises displaying an image described in the second code on the second region as a background of the second region based on the content displayed on the first region.

3. An electronic device, comprising:
   a display configured to output a screen on which a web browser is executed, the screen configured to be provided as a multi-view image and including a first region comprising a planar display region displaying content and a second region comprising a stereoscopic display region displaying a user interface of the web browser;

a communication circuit configured to receive a web document including a first code associated with the first region and a second code associated with the second region from a server; and a processor configured to display the content on the first region based on the first code and to display an object on the second region based on the second code, wherein the processor is configured to:

display another content associated with the object on the first region and display another object associated with the object on the second region, if an input on the object is received.

4. The electronic device of claim 3, wherein the first region is planar, and wherein the second region is at least one of: globular or cylindrical.

5. The electronic device of claim 3, further comprising:
a memory configured to store the web browser including a parsing module comprising a program element configured to parse the web document, a first execution module comprising a program element configured to execute the first code, and a second execution module comprising a program element configured to execute the second code, wherein the processor is configured to:

extract the first code and the second code by parsing the web document using the parsing module;

display the content on the first region using the first execution module; and display the object on the second region using the second execution module.

6. The electronic device of claim 3, wherein the processor is configured to:

display an image associated with the second code on the second region.

7. The electronic device of claim 3, wherein the processor is configured to:

display a moving image associated with the first code on the first region;

extract the second code by parsing a caption file associated with the first code; and display the object associated with the second code on the second region.

8. The electronic device of claim 3, wherein the processor is configured to:

display the object at a time set in the second code.

9. The electronic device of claim 3, wherein the processor is configured to:

display the object at a size set in the second code.

10. The electronic device of claim 3, wherein the processor is configured to:

change the object based on a script included in the second code.

11. The electronic device of claim 3, wherein the processor is configured to:

display the object associated with the second code, if a gaze at a region set in the second code is detected.

12. The electronic device of claim 3, wherein the processor is configured to:

change another object displayed on the second region together with the object associated with the second code, based on the second code.

13. The electronic device of claim 3, wherein the processor is configured to:

control an external device linked with the electronic device, based on the second code.

14. The electronic device of claim 3, wherein the processor is configured to:

change at least one of: a location, an angle, or a size where the object is displayed, if an input on the object is received.

15. The electronic device of claim 3, further comprising:
a camera configured to be electrically connected with the processor, wherein the processor is configured to:

display the object together with a subject captured by the camera in proportion to a real size of the object and a real size of the captured subject.

16. A method for outputting a web document in an electronic device, the method comprising:

executing a web browser;

outputting a screen on which a web browser is executed, the screen being provided as a multi-view image and including a first region comprising a planar display region displaying content and a second region comprising a stereoscopic display region displaying a user interface of the web browser;

receiving, from a server, a web document including a first code associated with the first region and a second code associated with the second region;

displaying the content on the first region based on the first code;

displaying an object on the second region based on the second code; and displaying another content associated with the object on the first region and displaying another object associated with the object on the second region, if an input on the object is received.

17. The method of claim 16, further comprising:
extracting the first code and the second code by parsing the web document.

18. The method of claim 16, further comprising:
extracting the second code by parsing a caption file associated with the first code.

19. The method of claim 16, wherein the displaying of the object on the second region comprises:
changing the object based on a script included in the second code.

* * * * *